P. HELMER.

ELECTRO MAGNETIC DENTAL HAMMER AND PLUGGER.

No. 10,940. Reissued June 26, 1888.

Witnesses
L. P. Lalieve
Horace L. Wadsworth.

Inventor
Philip Helmer

By Attorney
Francis W. Parker.

THE NORRIS PETERS CO., PHOTO-LITHO., WASHINGTON, D.C.

UNITED STATES PATENT OFFICE.

PHILIP HELMER, OF CLINTON, IOWA.

ELECTRO-MAGNETIC DENTAL HAMMER AND PLUGGER.

SPECIFICATION forming part of Reissued Letters Patent No. 10,940, dated June 26, 1888.

Original No. 368,948, dated August 30, 1887. Application for reissue filed May 7, 1888. Serial No. 273,136.

*To all whom it may concern:*

Be it known that I, PHILIP HELMER, a citizen of the United States of America, residing at Clinton, in the county of Clinton and State of Iowa, have invented certain new and useful Improvements in Electro-Magnetic Dental Mallets and Pluggers, of which the following is a specification, reference being had to the accompanying drawings.

My invention relates to an electro-magnetic dental mallet and plugger constructed and operated as hereinafter fully set forth.

Figure 1:
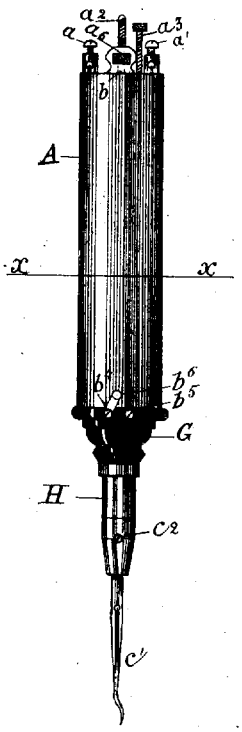
Figure 2:
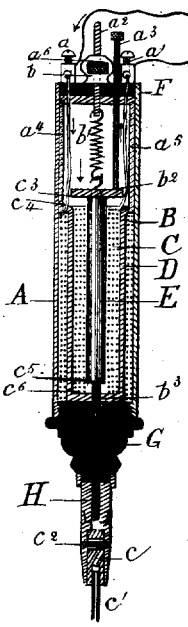
Figure 3:
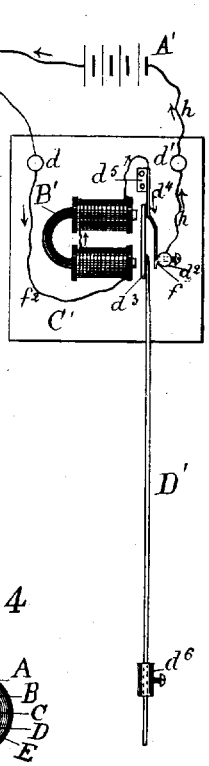
Figure 4:
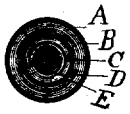

In the accompanying drawings, Figure 1 is a side elevation of the mallet. Fig. 2 is a longitudinal central section of the tool. Fig. 3 shows the battery, magnet, and circuit-breaking devices connected electrically with the tool. Fig. 4 is a cross-section taken on the line $x$ $x$ of Fig. 1.

A designates the inclosing-case, constructed of non-magnetic material.

B and C designate the outer and inner electric coils, respectively surrounding tubular magnet and space in which reciprocates the core.

D is the tubular magnet, of soft iron.

E is the inner core or armature, of soft iron.

The tubular magnet is open and flanged outwardly at the top to increase its magnetic power, and is provided with a closed perforated bottom, as shown.

F designates the head of the tool, of gutta-percha or other insulating material, provided with the binding-posts $a$ $a'$ and adjusting-screws $a^2$ $a^3$. This head is supported by the non-magnetic posts $a^4$ $a^5$, fastened at their lower ends to the flanges of the tubular magnet, and the posts are flanged inward at the top, forming a seat for the head, which is fastened, by screws or by any other suitable devices, upon the seat. The screw $a^2$ is provided with an adjusting-nut, $a^6$, which nut and screw are supported in place by the bearing $b$, fastened to the head, and the screw is extended downward through the head, and its lower end is attached to the upper end of the coil-spring $b'$, which has its lower end attached to the disk-head $b^2$ of the armature E. The lower end of screw $a^3$ impinges upon the disk to regulate the length of the stroke, as hereinafter described.

The armature E is constructed to reciprocate freely in the inner helix, and its lower end is provided with a mallet-rod, $b^3$, of non-magnetic material, and is extended loosely downward through a central hole in the lower end of the magnet D and through the lower portion of the tool, as shown.

G designates the supporting-base of the body of the tool, of gutta-percha or other insulating material, securely fastened in any suitable manner to the lower end of the tubular magnet, and its upper portion is threaded to fit the threaded end of the case A. This base is provided with the two contact-posts $b^4$ $b^5$ and switch $b^6$ and electrically connected with the wires in or between the electric coils.

H designates the plugger-stem, provided with a socket to receive loosely the plugger-point holder $c$, which is provided with a socket to receive and hold securely the end of the plugger-point $c'$. The holder $c$ is provided with a slot to receive the pin $c^2$, inserted through the stem and holder, as shown. The slot in the holder $c$ is made long enough only to allow the requisite slight reciprocating motion of the holder and point. The points of magnetic attraction in the tool are indicated by the lines $c^3$ $c^4$ $c^5$ $c^6$ in Fig. 2 of the drawings.

A′ indicates the electric battery, and B′ the magnets of the circuit-breaker, constructed, arranged, and electrically connected with the tool in the usual manner. The base C′ of the magnets is provided with the binding-posts $d$ $d'$ $d^2$.

The circuit-breaker consists of the magnets B′, the armature $d^3$, the spring $d^4$, and adjustable contact-point $f$. The upper end of the spring is attached to the post $d^5$, and the upper end of the armature is attached to the spring, the lower portion of which spring is extended downward and outward to be brought in contact with the adjustable point, as shown.

D′ is a pendulum-rod attached at its upper end to the lower end of the armature, and is provided with an adjustable weight, $d^6$.

The tool is connected with the battery and magnet by the wires $f'$, $f^2$, and $h$, connected with the binding-posts, as shown. The core E, disk $b^2$, and rod $b^3$ constitute the parts of the mallet by means of which the blow is produced upon the plugger. The mallet-rod $b^3$ is preferably securely attached to the lower end of the armature, as shown; but this rod may be disconnected and caused to reciprocate separately from the armature, if desired.

The connections between the tool, battery, and magnets being all properly made, as soon as the switch is closed, by turning it so as to connect the two contact-points $b^4$ $b^5$, the electric current starts from the battery A′, and is conducted along the wire $f'$ to the binding-post $a$, through the coil B, contact-posts, and switch $b^4$ $b^5$ $b^6$, the coil C, binding-post $a'$, along the wire $f^2$, post $d$, magnets B′, post $d^5$, armature and spring $d^3$ $d^4$, post $d^2$, along wire $h$, through post $d'$, to the battery, thus completing the circuit, and the core E, tubular magnet D, and cores of the magnets B′ are magnetized, and the core E is drawn down, causing the lower end of its rod to strike the upper end of the plugger holder $c$, producing the blow upon the plugger. At the same time that the blow is thus produced the magnets B′ attract the armature $d^3$, separating the spring $d^4$ from the contact-point $f$, breaking the circuit.

The operation of the circuit-breaker is retarded very slightly by the weighted pendulum to allow the full blow to be produced upon the plugger before the circuit is broken. The parts previously magnetized being now demagnetized, the spring $b'$ raises the core E, the pendulum D′, armature $d^3$, and spring $d'$ swing back and again close the circuit, and the operation is repeated in rapid succession and is continued until the switch is opened by moving its free end away from the post $b^5$.

The force of the blow upon the plugger is regulated by the adjustment of the tension-screw $a^2$ by means of its adjusting-nut. To lessen the force of the blow the screw is moved upward, and to increase the force of the blow the screw is moved downward.

The length of the movement of the mallet is increased and lessened by adjusting the screw $a^3$ upward and downward as required.

The rapidity of the blows of the mallet may be regulated to the extent required by the adjustment upward or downward of the weight $d^6$ upon the pendulum. To increase the rapidity of the movements, the weight is moved upward, and vice versa.

It will be noticed that the electric circuit is formed through the magnets of the plugger and the magnets of the circuit-breaker simultaneously.

What I claim as new is—

1. In an electro-magnetic dental mallet and plugger, the combination of the inner and outer electric coils, B C, the core E, having the disk-head $b^2$, the mallet-rod $b^3$, the adjusting-screws $a^2$ $a^3$, the tension-spring $b'$, the tubular magnet D, the posts $a^4$ $a^5$, supporting the head F, the binding-posts $a$ $a'$, the stem H, the slotted holder $c$, and the plugger $c'$, substantially as and for the purposes described.

2. In an electro-magnetic dental mallet and plugger, the inner and outer electric coils, B C, the core E, having the disk-head $b^2$, the mallet-rod $b^3$, the adjusting devices $a^2$ $a^3$, the tension-spring $b'$, the tubular magnet D, the supporting devices $a^4$ $a^5$, the binding-posts $a$ $a'$, the stem H, the slotted holder $c$, and the plugger $c'$, in combination with the magnets B′, the contact-spring $d^4$, the armature $d^3$, attached to the spring, the adjustable contact-point $f$, and the pendulum D′, attached to the armature and provided with the adjustable weight $d^6$, substantially as and for the purpose described.

3. In an electro-magnetic dental mallet and plugger, the combination of the inner and outer electric coils, B C, the movable core E, having the disk-head $b^2$, the mallet-rod $b^3$, and the fixed tubular magnet D.

PHILIP HELMER.

Witnesses:
JOS. J. FIELDS,
J. S. BROWN.